Figure 1:
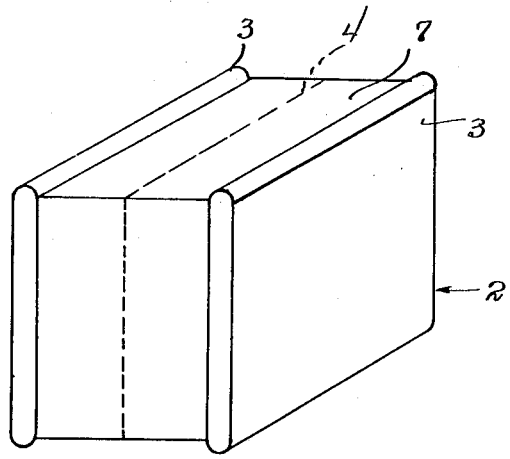

Oct. 2, 1945.    J. W. JORDAN    2,385,921
CELLULATION OF PLASTICS

Original Filed Jan. 23, 1941

INVENTOR
JOHN W. JORDAN

BY Olen E. Bee
ATTORNEY.

Patented Oct. 2, 1945

2,385,921

UNITED STATES PATENT OFFICE 2,385,921

CELLULATION OF PLASTICS

John W. Jordan, Port Allegany, Pa., assignor to Pittsburgh Corning Corporation, Allegheny County, Pa., a corporation of Pennsylvania Original application January 23, 1941, Serial No. 375,551. Divided and this application July 11, 1942, Serial No. 450,585

1 Claim. (Cl. 117—70)

The present application is a division of my copending case Serial No. 375,551, filed January 23, 1941, and entitled "Composite building unit."

The parent application is particularly designed to cover the application of a cellular cushioning layer to edges of glass building blocks. The present application is directed more broadly to the method of forming a cellular body of plastic, which method is disclosed in my prior application, irrespective of the subsequent application of it to a supporting body.

One object of the invention is to provide an inexpensive and simple method of forming bodies of cellular plastic, and particularly it has for an object the formation of cellular, compressible, layers of plastic upon surfaces of glass bodies. The application of cushioning coatings to the edges of glass building blocks constitutes one illustration of the invention.

Other objects and advantages of my invention will become more apparent from the following detailed description of certain preferred embodiments thereof.

Hollow glass blocks have gained widespread recognition and are being specified by many architects and designers for modern constructions. They are especially suited for wall structures through which visibility is restricted but light may pass. These blocks are usually installed in buildings by setting in cement mortar to form monolithic panels. It is, however, very difficult to obtain a satisfactory bond between the mortar and the smooth non-absorptive surfaces of the blocks. As a consequence, many suggestions for improving the union of mortar and glass blocks have been considered and tried.

For example, it was proposed to groove or serrate the mortar-bearing edges of the blocks. Another thought was the provision of a flange which could be embedded in the mortar. Manufacturing and handling difficulties prevented adoption of these ideas. A more recent development entailed a coating of the mortar-bearing edges of the blocks with a granular material, various types of binders being employed. This procedure gave an improved mortar-bearing surface and bond, but failed to provide a bond which was satisfactory under all service conditions. Most recently, a combination of synthetic resins, particularly vinyl acetate and ethyl silicate, with or without a granular embedment has been used to form the bond coating.

It has been found, however, that the improvement in bond strengths now obtained creates a new problem, that of guarding against failures within the monolithic panels by reason of stresses generated by differential movements of the glass and mortar under changing conditions of temperature and humidity. These failures may appear either as broken glass units or as cracks in the mortar sections. It has been possible even with high bond values to eliminate to a great extent the stresses arising from temperature changes by matching the thermal coefficients of the glass and the mortar. A similar control over stresses resulting from moisture changes is not possible because the glass is non-hygroscopic while cement mortars are quite subject to volume expansion and contraction with varying conditions of humidity.

In an endeavor to overcome the problem of failures in service, further research has been carried on. Different compositions of glass from which the building units are formed have been tried. There has been a structural re-design of the units, and they have been accorded special heat treatments. Changes in and a more exact control over the mortar mixes have been followed. These developments have afforded substantial improvements in constructions employing glass blocks, but the desired goal has not yet been attained.

Briefly stated the present invention contemplates a solution of the foregoing difficulties by the application to the mortar-bearing edges of vitreous building units of a coating of resilient material to provide a cushion between the vitreous blocks and the mortar in which they are set, maintaining at the same time weather resistance and bond strength.

Figure 2:
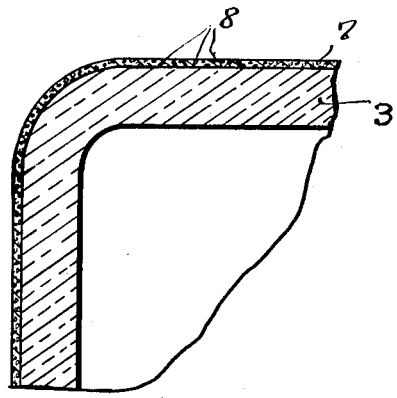

In the drawing, Figure 1 is an isometric view of a composite building unit embodying the features of my invention, and Figure 2 is a fragmentary vertical sectional view thereof, on a larger scale.

Referring to the drawing, a building unit 2 is in the form of a hollow block and comprises symmetrical sections 3 of glass or other vitreous material united at 4 in any suitable manner. The edges of the unit are covered with a coating 7 of resilient material forming the desired mortar-bonding surface and protective "cushion."

The coating 7 is composed of at least two layers of synthetic resins. The undercoat is preferably composed of a mixture of polyvinyl butyral resin and hydrolyzed ethyl silicate, a combination which adheres tenaciously to glass. The outer coat is formed of a resin of the polyvinyl acetal type, polyvinyl butyral resin being particularly suitable. The undercoat is most practically applied to the glass surfaces by a conventional spray process operating at normal temperatures. The second layer is preferably applied by a high-pressure spraying process operating at an elevated temperature. A solution, containing from 25 to 30% by weight of polyvinyl butyral resin dissolved in ethyl alcohol and heated to approximately 165° F., will have a sufficiently low viscosity to be handled in an air-gun.

The second layer formed by this process has dispersed therethrough minute gas bubbles 8 or cells. The presence of these cells increases materially the resilience of the coating. By varying the concentration of the resin solution, the rate of drying, and other factors, it is possible to control the bubble formation and therethrough the resiliency of the cushioning layer. For example, by use of high concentrations of plastic, highly volatile solvents and high temperatures in the plastic solution as high as possible, the solvent is quickly evaporated from the film to such degree as to render the composition so viscous as to obviate escape of bubbles. The slower the increase of viscosity, obviously, the more bubbles escape. Experiments have demonstrated that it is entirely practical and economical to obtain cells constituting approximately 50% of a layer of from 0.010 to 0.015 of an inch in thickness.

While the foregoing is the present preferred method of obtaining a resilient coating of the required type, a similar cushioning effect may be obtained by dispersing finely divided cork, sponge rubber, or other cellulated material through the resin coating. Though these fillers will provide resilience they are not quite so desirable from the standpoint of cost and appearance.

It will at once be obvious that various modifications in the composition of the coating layer and the formation of my composite building unit are possible without departing from the spirit of the invention or the scope of the appended claim.

What I claim is:

A process of forming an adherent cellular layer of plastic upon a glass surface, which comprises preliminarily coating the surface with hydrolyzed ethyl silicate, then spraying an approximately 30 percent solution of vinyl acetal resin in ethyl alcohol at a temperature of about 165° F. upon said surface in such manner as to form and entrap bubbles in the vinyl acetal layer.

JOHN W. JORDAN.